United States Patent
Von Hebel et al.

(10) Patent No.: US 9,365,778 B2
(45) Date of Patent: Jun. 14, 2016

(54) PROCESS FOR LIQUEFYING A CELLULOSIC MATERIAL AND ITS PRODUCTS

(75) Inventors: Klaas Lambertus Von Hebel, Amsterdam (NL); Jean-Paul Lange, Amsterdam (NL)

(73) Assignee: Shell Oil Company, Houston, TX (US)

(*) Notice: Subject to any disclaimer, the term of this patent is extended or adjusted under 35 U.S.C. 154(b) by 1045 days.

(21) Appl. No.: 13/106,553

(22) Filed: May 12, 2011

(65) Prior Publication Data
US 2011/0277378 A1 Nov. 17, 2011

(30) Foreign Application Priority Data
May 12, 2010 (EP) ...................................... 10162722

(51) Int. Cl.
*C10G 1/06* (2006.01)
*C08H 8/00* (2010.01)

(52) U.S. Cl.
CPC *C10G 1/065* (2013.01); *C08H 8/00* (2013.01); *C10G 2300/1014* (2013.01); *C10G 2300/44* (2013.01); *C10G 2400/02* (2013.01); *C10G 2400/04* (2013.01); *C10G 2400/08* (2013.01); *Y02E 50/13* (2013.01); *Y02P 30/20* (2015.11)

(58) Field of Classification Search
CPC ............ C10G 1/00; C10G 1/008; C10G 1/06; C10G 1/065
USPC .......................................... 585/240, 242, 250
See application file for complete search history.

(56) References Cited

U.S. PATENT DOCUMENTS

| | | | |
|---|---|---|---|
| 3,065,263 A | 11/1962 | Carlson | |
| 4,485,008 A | 11/1984 | Maa et al. | |
| 5,336,819 A | 8/1994 | McAuliffe et al. | |
| 5,364,935 A | 11/1994 | Cox et al. | |
| 5,608,105 A | 3/1997 | Fitzpatrick | |
| 6,054,611 A | 4/2000 | Farone et al. | |
| 2005/0118691 A1* | 6/2005 | Fagan et al. | 435/135 |
| 2007/0100162 A1* | 5/2007 | Petrus et al. | 562/515 |
| 2008/0072478 A1 | 3/2008 | Cooper | |
| 2009/0326286 A1* | 12/2009 | Yie et al. | 585/240 |
| 2010/0292507 A1* | 11/2010 | Lange | 562/606 |
| 2010/0307050 A1 | 12/2010 | Sen et al. | |
| 2011/0113675 A1 | 5/2011 | Fujiyama et al. | |
| 2011/0154722 A1 | 6/2011 | Chheda et al. | |

(Continued)

FOREIGN PATENT DOCUMENTS

| | | |
|---|---|---|
| CN | 1894230 | 1/2007 |
| CN | 101225319 | 7/2007 |
| CN | 101012387 | 8/2007 |

(Continued)

OTHER PUBLICATIONS

Bovier, J. M. et al.,"Direct Liquefaction of Wood by Solvolysis", "Pyrolysis Oils from Biomass", pp. 129-138, by E. Soltes et al, for ACS Symposium Series, American Chemical Society, Washington, DC, 1988.

(Continued)

*Primary Examiner* — In Suk Bullock
*Assistant Examiner* — Philip Louie

(57) ABSTRACT

A process for liquefying a cellulosic material to produce a liquefied product from cellulosic material is provided. Products obtained from such process and use of such products to prepare biofuels is also provided.

9 Claims, 2 Drawing Sheets

(56) References Cited

U.S. PATENT DOCUMENTS

2011/0167713 A1 7/2011 Quignard et al.
2012/0005949 A1 1/2012 Stevens et al.

FOREIGN PATENT DOCUMENTS

| CN | 101394928 | 3/2009 |
|---|---|---|
| EP | 366138 | 10/1988 |
| EP | 0366138 | 5/1990 |
| EP | 2011569 | 1/2009 |
| EP | 2325281 | 5/2011 |
| WO | 9819986 | 5/1998 |
| WO | 03035582 | 5/2003 |
| WO | 2005058793 | 6/2005 |
| WO | 2005058856 | 6/2005 |
| WO | 2006067171 | 6/2006 |
| WO | 2009077606 | 6/2009 |
| WO | 2011082000 | 7/2011 |
| WO | 2011082001 | 7/2011 |

OTHER PUBLICATIONS

Bozell, Joseph J. et al., "Production of Levulinic Acid and Use as a Platform Chemical for Derived Products," Resources, Conservation & Recycling, 2000, vol. 28, pp. 227-239.

Corma, Avelino et al., Processing Biomass-Derived Oxygenates in the Oil Refinery: Catalytic Cracking (FCC) Reaction Pathwaus and Role of Catalyst, Journal of Catalysis, vol. 247, Dec. 31, 2007, pp. 307-327.

Elliot D.C., et al "Developments in Direct Thermochemical Liquefaction of Biomass", 1983-1999, Energy & Fuels, vol. 5, Dec. 31, 1991, pp. 399-410.

Garves, K., "Acid Catalyzed Degradation of Cellulose in Alcohols," Journal of Wood Chemistry and Technology, Marcel Dekker, NY, US, vol. 8, No. 1., 988, pp. 121-134, (1988).

Kawamoto, H. et al., "Thermochemical Conversion of Cellulose in Polar Solvent (Sulfolane) Into Levoglucosan and Other Low Molecular-Weight Substances", Journal of Analytical & Applied Pyrolysis 70, 2003, pp. 303-313, Kyoto University, Japan.

Lee, S. H., et al., "Rapid Wood Liquefaction by Supercritical Phenol", Wood Science Technology, vol. 37, 2003, pp. 29-38.

Meier, Dietrich et al., "Catalytic Hydroliquefaction of Spruce Wood—And Middle-Distillate Oils", Federal Research Centre for Forestry & Forest Products Institute of Wood Chemistry & Chemistry & Technology of Wood, Leuschnerstr. 91, pp. 785-800, D-2050, Hamburg, Germany, (1991).

Meier, Dietrich et al., "Catalytic Hydroliquefaction of Spruce Wood - Elemental Balance and Effect of Catalyst", Journal of Wood Chemistry & Technology, vol. 8 (4), pp. 523-542 (1988).

Moffatt, J.M., et al., "Direct Liquefaction of Wood Through Solvolysis & Catalytic Hydrodeoxygenation: an Engineering Assessment", Biomass 7, (1985) pp. 99-123, Canada.

Mohan, Dinesh et al., "Pyrolysis of Wood/Biomass for Bio-Oil: A Critical Review", Energy & Fuels, vol. 20, 2006.

Roman-Leshkov, Y. et al., "Production of Dimethylfuran for Liquid Fuels from Biomass-Derived Carbohydrates," Nature 2007, vol. 447, Jun. 2007, pp. 982-986.

Willner, T., "Direct Liquefaction as a Future Basis for 3rd Generation Biofuel Production", Hamburg University of Applied Science, published for 17th European Biomass Conference & Exhibition, Jun. 29-Jul. 3, 2009.

Wyman, Charles E., et al., "Coordinated Development of Leading Biomass Pretreatment Technologies", Bioresource Technology, vol. 96, 2005, pp. 1959-1966.

Lide, David R. Ph.d, CRC Handbook of Chemistry & Physics, "Octanol-Water Partition Coefficients", 83rd Ed., (2002) pp. 16-43 to 16-47.

* cited by examiner

PROCESS FOR LIQUEFYING A CELLULOSIC MATERIAL AND ITS PRODUCTS

This application claims the benefit of European Application No. 10162722.2 filed Mar. 12, 2010, which is incorporated herein by reference.

TECHNICAL FIELD OF THE INVENTION

The present invention relates to a process for liquefying a cellulosic material. The process provides a liquefied product which may be converted into biofuel components for use in fuel formulations.

BACKGROUND OF THE INVENTION

Cellulosic materials which may be converted into valuable intermediates, which intermediates may be further processed into fuel components, are of considerable interest as feedstocks for the production of sustainable biofuels. Biofuels are combustible fuels, that can be derived from biological sources. The use of such biofuels results in a reduction of greenhouse gas emissions. Such biofuels can be used for blending with conventional petroleum derived fuels. Biofuels used for blending with conventional gasoline fuels include alcohols, in particular ethanol. Biofuels such as fatty acid methyl esters derived from rapeseed and palm oil can be blended with conventional diesel fuels. However, these biofuels are derived from edible feedstock and so compete with food production.

Biofuels derived from non-edible renewable feedstocks, such as cellulosic material, are becoming increasingly important, both economically and environmentally. In addition there has been much interest in developing improved methods for producing biofuels derived from non-edible renewable feedstocks, such as cellulosic material. Fuel components can be derived from cellulose derivatives using multistep processes, for instance levulinate (Bozels et al., Resources, Conservation and Recycling 2000, 28, 227), valerate (WO 2006/067171) or pentenoate (WO 2005/058793) esters from levulinic acid or methyl-furan (Roman-Leshkov et al., Nature 2007, 447, 982) or ethyl furfuryl ether (WO 2009/077606) from furfural.

It would, however, be advantageous to be able to convert cellulosic material such as for example lignocelluloses into a liquefied product, which liquefied product could then be fed to an oil refinery for upgrading to fuel components.

WO 2005/058856 describes a process for liquefaction of cellulosic material. In the process solid cellulosic material is heated in the presence of an acid catalyst and a solvent. The solvent contains a compound having a gamma lactone group of a specific general molecular formula. Examples of such compounds that are mentioned include gamma-valerolactone. It is further indicated that also levulinic acid, furfural or compounds without a gamma lactone group that are obtainable from levulinic acid or furfural may be used as solvent in the process. The process is suitable for its purpose, but unfortunately the large amounts of expensive solvent that are needed make the process economically less attractive.

U.S. Pat. No. 5,608,105 describes a process for producing levulinic acid from carbohydrate-containing materials. It describes as an example reacting a slurry of paper sludge containing 3.5% by weight of the aqueous portion sulfuric acid with steam in a series of two reactors. The liquid product outflow contains levulinic acid at a concentration of 0.68%. A disadvantage of the described process is that the process produces large amounts of low-value insoluble humins and, therefore, offers poor utilization of the feedstock. In addition the process is an extensive process using two reactors.

There remains a continuing need for the development of improved processes for liquefying cellulosic material.

SUMMARY OF THE INVENTION

Accordingly, in one embodiment of the present invention provides a process for liquefying a cellulosic material to produce a liquefied product, which process comprises contacting the cellulosic material simultaneously with
(a) an acid catalyst;
(b) a solvent mixture containing water and a co-solvent, which co-solvent comprises one or more polar solvents and which co-solvent is present in an amount of more than or equal to 10% by weight and less than or equal to 95% by weight, based on the total weight of water and co-solvent;
(c) a hydrogenation catalyst; and
(d) a source of hydrogen.

The process allows for the simultaneous hydrolysis and hydrogenation of the cellulosic material.

In another embodiment of the present invention provides a product comprising:
(a) in the range from 20 to 80 wt % of a monomeric fraction containing one or more monomeric compounds having a molecular weight (Mw) of less than or equal to 250 Dalton (Da);
(b) in the range from 20 to 80 wt % of an oligomeric fraction containing one or more oligomeric compounds having a molecular weight (Mw) of more than 250 Dalton (Da), wherein the percentage of saturated carbon atoms in the oligomeric fraction is more than or equal to 35%, based on the total amount of carbon atoms present.

In yet another embodiment of the invention provides a process for producing a biofuel component from a cellulosic material, which process comprises
(a) contacting the cellulosic material simultaneously with an acid catalyst, a solvent mixture containing water and a co-solvent comprising one or more polar solvents, a hydrogenation catalyst and a source of hydrogen to produce a liquefied product;
(b) obtaining one or more monomeric compounds and/or one or more oligomeric compounds from the liquefied product obtained in step a) to produce a second product comprising one or more monomeric compounds and/or one or more oligomeric compounds;
(c) hydrodeoxygenating and/or cracking at least part of the second product obtained in step b) to produce a fuel component and/or fuel component precursor;
(d) blending and/or processing the fuel component and/or the fuel component precursor in the preparation of a biofuel.

The process of the invention furthermore provides a novel product containing a substantial amount of tetrahydropyranic monomers and/or oligomers, which can be useful as a gasoline and/or diesel component.

In yet another embodiment of the invention provides a fuel composition comprising one or more tetrahydropyranic monomers and/or oligomers.

DETAILED DESCRIPTION OF THE INVENTION

Figure 1:
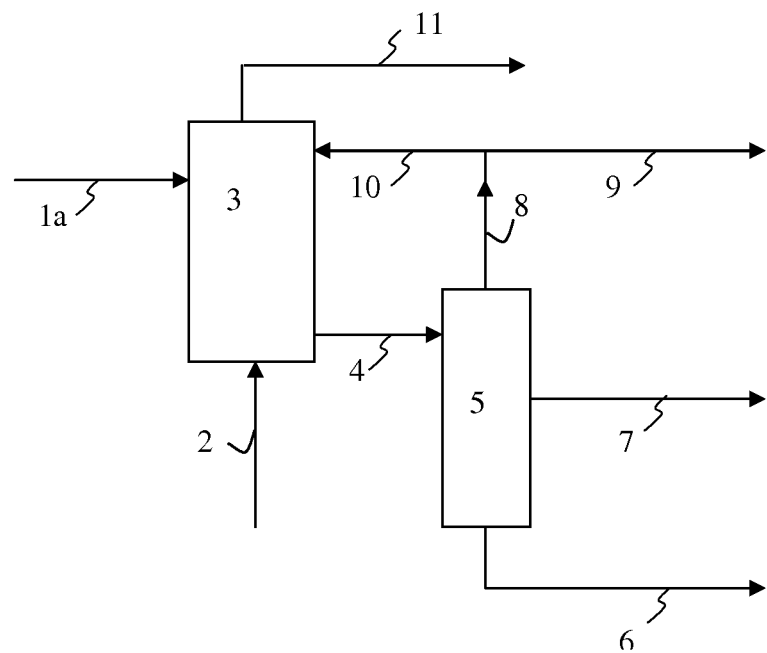
FIG. 1 shows a schematic diagram of a first process according to the invention.

It would for example be an advancement in the art to provide a process for liquefying a cellulosic material having an increased degree of liquefaction and a reduction in the amount of unwanted insoluble humins. It can furthermore be an advancement in the art to reduce the number of process steps from cellulosic starting material to biofuel end product.

It has been found that the process according to the invention results in an increased degree of liquefaction of the cellulosic material, even at high cellulose loading. It thereby delivers more valuable products, such as monomeric and oligomeric compounds. With the process according to the invention, such valuable monomeric and oligomeric compounds may advantageously be prepared from materials which are readily available. These monomeric and oligomeric compounds may subsequently be converted into other hydrocarbons or biofuels.

Further, the high degree of saturation of the produced monomeric and/or oligomeric compounds, results in improved chemical stability and increased heating value of the product. This high degree of saturation makes it possible to use the product of the process according to the invention directly as a fuel component or to process the product in a refinery without any additional pretreatment.

In addition to the above, the process according to the invention offers processing efficiencies by allowing a reduction of the number of process steps from a cellulosic starting material to a biofuel end product.

By liquefying is herein understood the conversion of a solid material, such as cellulosic material, into one or more liquefied products. Liquefying is sometimes also referred to as liquefaction.

By a liquefied product is herein understood a product that is liquid at ambient temperature (20° C.) and pressure (1 bar absolute) and/or a product that can be converted into a liquid by melting (for example by applying heat) or dissolving in a solvent. Preferably the liquefied product is liquid at ambient temperature (20° C.) and pressure (1 bar absolute).

Liquefaction of a cellulosic material can comprise cleavage of covalent linkages in that cellulosic material. For example liquefaction of lignocellulosic material can comprise cleavage of covalent linkages in the cellulose, hemicellulose and lignin present and/or cleavage of covalent linkages between lignin, hemicelluloses and/or cellulose.

As used herein, cellulosic material refers to material containing cellulose. Preferably the cellulosic material is a lignocellulosic material. A lignocellulosic material comprises lignin, cellulose and optionally hemicellulose. The process according to the invention makes it possible to liquefy not only the cellulose but also the lignin and hemicelluloses.

Any suitable cellulose-containing material may be used in the process according to the present invention. The cellulosic material for use according to the invention may be obtained from a variety of plants and plant materials including agricultural wastes, forestry wastes, sugar processing residues and/or mixtures thereof. Examples of suitable cellulose-containing materials include agricultural wastes such as corn stover, soybean stover, corn cobs, rice straw, rice hulls, oat hulls, corn fibre, cereal straws such as wheat, barley, rye and oat straw; grasses; forestry products such as wood and wood-related materials such as sawdust; waste paper; sugar processing residues such as bagasse and beet pulp; or mixtures thereof.

Before being used in the process of the invention, the cellulosic material is preferably processed into small particles in order to facilitate liquefaction. Preferably, the cellulosic material is processed into particles with an average particle size of 0.5 to 30 mm. If the cellulosic material is a lignocellulosic material it may also have been subjected to a pre-treatment to remove and/or degrade lignin and/or hemicelluloses. Examples of such pre-treatments include fractionation, pulping and torrefaction processes.

The, optionally pre-processed, cellulosic material can be simultaneously contacted with an acid catalyst, a solvent mixture containing water and a co-solvent comprising one or more polar solvents, a hydrogenation catalyst, and a source of hydrogen. As indicated above, the process according to the invention can advantageously comprise the simultaneous hydrolysis and hydrogenation of the cellulosic material, resulting in an improved degree of liquefaction. By simultaneous contact is understood contact of the cellulosic material with one of the specified claim features in the presence of the remaining claim features. In this way simultaneous hydrolysis and hydrogenation of the cellulosic material can be effected as any hydrolysis product can be in-situ hydrogenated.

The acid catalyst for use in the process according to the invention may be any acid catalyst known in the art to be suitable for liquefying of cellulosic material. For example, the acid catalyst may be a Brönsted acid or a Lewis acid. Further the acid catalyst may be a homogeneous catalyst or a heterogeneous catalyst. Preferably the acid catalyst is a homogeneous or finely dispersed heterogeneous catalyst, most preferably the acid catalyst is a homogeneous catalyst. Preferably the acid catalyst remains liquid and stable under the process conditions of the invention and preferably it is sufficiently strong to effect cleavage of the covalent linkages and dehydration of the cellulosic material.

Preferably the acid catalyst is a Brönsted acid and more preferably the acid catalyst is a mineral or organic acid, preferably a mineral or organic acid having a pKa value below 3.75, more preferably a mineral or organic acid having a pKa value below 3, and most preferably a mineral or organic acid having a pKa value below 2.5.

Examples of suitable mineral acids include sulphuric acid, para toluene sulphonic acid, nitric acid, hydrochloric acid and phosphoric acid, and mixtures thereof. In a preferred embodiment, the acid catalyst used in the process of the invention is sulphuric acid or phosphoric acid.

Examples of suitable organic acids which may be used in the process of the invention include oxalic acid, formic acid, lactic acid, citric acid, trichloracetic acid and mixtures thereof.

The acid catalyst is preferably present in an amount of less than or equal to 35% by weight, more preferably less than or equal to 20% by weight, even more preferably less than or equal to 10% by weight and most preferably less than or equal to 5% by weight, based on the total weight of solvent mixture and acid catalyst. Further the acid catalyst is preferably present in an amount of more than or equal to 0.01% by weight, more preferably more than or equal to 0.1% by weight and most preferably more than or equal to 0.2% by weight, based on the total weight of solvent mixture and acid catalyst. It will be appreciated that for any given acid catalyst the amount of acid required will depend on the strength of the acid. In one preferred embodiment, the acid catalyst is present in an amount of from 1% to 10% by weight, preferably from 2% to 5% by weight, based on the weight of solvent mixture and acid.

The solvent mixture contains water and a co-solvent, which co-solvent comprises one or more polar solvents. By a co-solvent, comprising one or more polar solvents, is understood a solvent other than water. Preferably the co-solvent comprises more than two, more preferably more than three polar solvents. In an especially preferred embodiment the co-solvent comprises at least a part of the liquefied product, which part of the liquefied product comprises one or more polar solvents. Advantageously, part of the liquefied product is therefore recycled to the liquefaction process to be used as co-solvent. More preferably the co-solvent comprises at least two monomeric compounds obtained from the liquefied product as a polar solvent. Most preferably more than 50 w % of the polar monomeric compounds obtained from the liquefied product are used as polar solvent. There is no upper limit for the number of different polar solvents that may be contained in the co-solvent, but in practice the number of different polar solvents in the co-solvent is suitably less than or equal to 500.

A measure of the polarity of a solvent is its log P value, where P is defined as the partition coefficient of a compound in a two phase octanol-water system. The log P value can be determined experimentally or calculated according to standard procedures as discussed in Handbook of Chemistry and Physics, $83^{rd}$ Edition, pages 16-43 to 16-47, CRC Press (2002).

In one embodiment the co-solvent is a solvent having a polarity of log P less than +1. In another embodiment, the co-solvent is a solvent having a polarity of log P less than +0.5. In a further embodiment, the co-solvent is a solvent having a polarity of log P less than 0.

The co-solvent can comprise any polar solvent that is stable under the liquefaction reaction conditions used and for the duration of the reaction time. Advantageously, the co-solvent may be water-miscible at the reaction temperature employed.

Preferably one or more of the polar solvents in the co-solvent is derived from cellulosic, and preferably lignocellulosic, material. More preferably one or more of the polar solvents is a solvent obtainable by acid hydrolysis of cellulosic, and preferably lignocellulosic, material such as for example acetic acid, formic acid and levulinic acid. Polar solvents which are obtainable from such acid hydrolysis products by hydrogenation may also suitably be used. Examples of such hydrogenation product solvents include gamma-valerolactone which is obtainable from levulinic acid by hydrogenation, tetrahydrofufuryl and tetrahydropyranyl components which are derived from furfural or hydroxymethylfurfural, mono- and di-alcohols and ketones which are derived from sugars, and guaiacol and syringol components which are derived from lignin. Preferably the co-solvent for use according to the invention may comprise one, two or more of such solvents.

The one or more polar solvents may comprise one or more carboxylic acids. By a carboxylic acid is herein understood an organic compound comprising at least one carboxyl (—COOH) group. In a preferred embodiment the co-solvent comprises at least one or more carboxylic acids. More preferably the co-solvent comprises equal to or more than 5 wt % carboxylic acids, more preferably equal to or more than 10 wt % carboxylic acids, most preferably equal to or more than 20 wt % of carboxylic acids, based on the total weight of co-solvent (i.e excluding water). There is no upper limit for the carboxylic acid concentration, but for practical purposes the co-solvent may comprise equal to or less than 90 wt %, more preferably equal to or less than 80 wt % of carboxylic acids, based on the total weight of co-solvent (i.e. excluding water).

Preferably the co-solvent comprises at least acetic acid, levulinic acid and/or pentanoic acid. Especially acetic acid may be useful for simultaneous use as a polar solvent as well as use as an acid catalyst.

In a preferred embodiment, the co-solvent comprises at least one or more polar solvents chosen from the group consisting of acetic acid, levulinic acid and gamma-valerolactone or mixtures thereof. More preferably the co-solvent is essentially free of other compounds.

In one preferred embodiment, as indicated also above, the co-solvent comprises one or more polar solvent(s) that are at least partly obtained and/or derived from the cellulosic, preferably lignocellulosic, material used as a feedstock in the liquefaction process of the invention itself. Any polar solvent obtainable from the cellulosic material liquefied according to the process of the invention may advantageously be generated in-situ and/or recycled and/or used as a make-up solvent in the liquefaction process, affording significant economic and processing advantages.

In a preferred embodiment any recycle of the solvent mixture comprises a weight amount of solvent mixture of 2 to 100 times the weight of the cellulosic material, more preferably of 5 to 20 times the weight of the cellulosic material.

In another preferred embodiment the co-solvent comprises one or more polar solvent(s) that are at least partly obtained and/or derived from a source other than the cellulosic material used as a feedstock in the liquefaction process of the invention itself, for example a petroleum source. These one or more polar solvent(s) may for example be mixed with the cellulosic material before starting the liquefaction process or may be added to the reaction mixture during the liquefaction process.

In a preferred embodiment the co-solvent comprises at least one or more carboxylic acids, such as for example acidic acid, levulinic acid and/or pentanoic acid, which carboxylic acid is preferably present before beginning the reaction, that is, which carboxylic acid is not in-situ obtained and/or derived from the cellulosic material during the reaction.

The co-solvent comprising one or more polar solvents is preferably present in an amount of less than or equal to 90% by weight and most preferably less than or equal to 80% by weight, based on the total weight of water and co-solvent. Further the co-solvent comprising one or more polar solvents is preferably present in an amount of more than or equal to 15% by weight and most preferably more than or equal to 20% by weight, based on the total weight of water and co-solvent. The co-solvent, comprising one or more polar solvents, is preferably present in an amount of from 10% to 80% by weight, and more preferably 20% to 70% by weight, most preferably from 20 to 60% by weight, based on the total weight of the water and co-solvent.

Preferably water is present in an amount of less than or equal to 85% by weight, more preferably less than or equal to 80% by weight, based on the total weight of water and co-solvent. Further water is preferably present in an amount of more than or equal to 10% by weight, more preferably 20% by weight, based on the total weight of water and co-solvent. Preferably, water is present in an amount of from 20% to 90% by weight, more preferably from 30% to 80% by weight, most preferably from 40% to 80% by weight based on the total weight of the water and co-solvent.

Preferably the solvent mixture contains the co-solvent and water in a weight ratio of co-solvent to water of less than or equal to 9:1, more preferably less than or equal to 8:2. Further the solvent mixture preferably contains the co-solvent and water in a weight ratio of co-solvent to water of more than or equal to 1:9 more preferably more than or equal to 2:8.

The cellulosic material and the solvent mixture containing water and co-solvent, are preferably mixed in a solvent mixture-to-cellulosic material ratio of 2:1 to 20:1 by weight, more preferably in a solvent mixture-to-cellulosic material ratio of 3:1 to 15:1 by weight and most preferably in a solvent mixture-to-cellulosic material ratio of 4:1 to 10:1 by weight.

One of ordinary skill can determine the weight percent of acid catalyst based on the weight of cellulosic material using the amount of acid catalyst provided above and the ratio of solvent mixture-to-cellulosic material. For example, the present disclosure provides on page 8 that the catalyst can be present in an amount of 2% by weight, based on the weight of solvent mixture and acid, and a ratio of solvent mixture-to-cellulosic material is 2:1 to 20:1. One of ordinary skill can determine that the weight percent of acid catalyst based on the weight of cellulosic material would be 4 wt % to 40 wt %. The illustrative calculation is shown below:

- 2 wt % of acid catalyst based on the weight of solvent mixture and acid catalyst=2 g acid catalyst for 100 g solvent mixture (2 g acid/100 g solvent)
- 2:1 ratio of solvent mixture-to-cellulosic material=200 g solvent mixture for 100 g cellulosic material (200 g solvent/100 g cellulosic material)
- Accordingly, for 100 g cellulosic material, there would be 200 g solvent, which would have 4 g of acid. As such, the weight percent of acid catalyst based on the weight of cellulosic material would be 4 wt %.
- For a ratio of solvent mixture-to-cellulosic material of 20:1, which is ten times more than the ratio of 2:1, the weight percent of acid catalyst would be 40 wt % based on the weight of cellulosic material.

The hydrogenation catalyst may be any hydrogenation catalyst that is resistant to the combination of the solvent mixture and the acid catalyst.

For example the hydrogenation catalyst can comprise a heterogeneous and/or homogeneous catalyst. In a preferred embodiment the hydrogenation catalyst is a homogeneous catalyst. In another preferred embodiment the hydrogenation catalyst is a heterogeneous catalyst.

The hydrogenation catalyst preferably comprises a hydrogenation metal known to be suitable for hydrogenation reactions, such as for example iron, cobalt, nickel, copper ruthenium, rhodium, palladium, iridium, platinum and gold, or mixtures thereof.

If the hydrogenation catalyst is a heterogeneous catalyst, the catalyst preferably comprises a hydrogenation metal supported on a carrier. Suitable carriers include for example carbon, titanium dioxide, zirconium dioxide, silicon dioxide and mixtures thereof. Examples of preferred heterogeneous hydrogenation catalysts include ruthenium, platinum or palladium supported on a carbon carrier. Other preferred examples of heterogeneous hydrogenation catalysts include ruthenium supported on titanium dioxide (TiO2), platina supported on titanium dioxide and ruthenium supported on zirconium dioxide (ZrO2). The heterogeneous catalyst and/or carrier may have any suitable form including the form of a mesoporous powder, granules or extrudates or a megaporous structure such as a foam, honeycomb, mesh or cloth. The heterogeneous catalyst may be present in a liquefaction reactor comprised in a fixed bed or ebullated slurry. Preferably the heterogeneous catalyst is present in a liquefaction reactor as a fixed bed.

If the hydrogenation catalyst is a homogeneous hydrogenation catalyst, the catalyst preferably comprises an organic or inorganic salt of the hydrogenation metal, such as for example the acetate-, acetylacetonate-, nitrate-, sulphate- or chloride-salt of ruthenium, platinum or palladium. Preferably the homogeneous catalyst is an organic or inorganic acid salt of the hydrogenation metal, wherein the acid is an acid which is already present in the process as acid catalyst or product.

The source of hydrogen may be any source of hydrogen known to be suitable for hydrogenation purposes. It may for example include hydrogen gas, but also an hydrogen-donor such as for example formic acid. Preferably the source of hydrogen is a hydrogen gas. Such a hydrogen gas can be applied in the process of the invention at a partial hydrogen pressure that preferably lies in the range from 2 to 200 bar (absolute), more preferably in the range from 10 to 170 bar (absolute), and most preferably in the range from 30 to 150 bar (absolute). A hydrogen gas can be supplied to a liquefaction reactor co-currently, cross-currently or counter-currently to the cellulosic material. Preferably a hydrogen gas is supplied counter-currently to the cellulosic material.

The liquefaction process according to the invention can be carried out at any total pressure known to be suitable for liquefaction processes. The process can be carried out under a total pressure that preferably lies in the range from 2 to 200 bar (absolute), more preferably in the range from 10 to 170 bar (absolute), and most preferably in the range from 30 to 150 bar (absolute).

The liquefaction process according to the invention can be carried out at any temperature known to be suitable for liquefaction processes. The process according to the invention is carried out at a temperature of preferably more than or equal to 50° C., more preferably more than or equal to 100° C. and still more preferably more than or equal to 150° C. and preferably less than or equal to 350° C., more preferably less than or equal to 300° C. and even more preferably less than or equal to 250° C. More preferably, the process is carried out at a temperature of from 150° C. to 250° C., most preferably from 180° C. to 220° C.

The liquefaction process according to the invention can be carried out batch-wise, semi-batch wise and continuously. The reaction effluent of the process according to the invention may include so-called humins, the liquefied product and for example water, co-solvent, acid catalyst, and/or hydrogenation catalyst and/or gaseous products such as for example hydrogen.

By humins is understood the solid insoluble material remaining after liquefaction. It is sometimes also referred to as char.

The liquefied product may comprise monomeric and/or oligomeric compounds and optionally excess water produced during the liquefaction process. From the liquefied product a product containing monomeric and oligomeric compounds can be obtained.

The reaction effluent is preferably forwarded to a separation section. In the separation section insoluble humins, monomeric and/or oligomeric compounds and/or water, co-solvent and/or acid catalyst can be separated off from the reaction effluent.

In one embodiment the humins may be separated from the reaction effluent in a manner known to be suitable for this purpose. Preferably such humins are separated off via filtration or settling. Any humins formed in the process according to the present invention can be converted to diesel, kerosene and gasoline fraction by conventional refining technologies such as fluidized catalytic cracking or hydrocracking and/or thermal cracking.

In another embodiment the liquefied products are separated from the reaction effluent in a manner known to be suitable for this purpose. Preferably liquefied products are separated off by liquid/liquid separation techniques, such as phase separation, (solvent) extraction and/or membrane filtration or (vacuum) distillation.

If desired the monomeric products and oligomeric products may be conveniently separated from each other using one or more membranes. For example, monomeric compounds and/or optionally water can be separated from any C9-C20 oligomeric compounds and C20+ oligomeric compounds by a ceramic membrane (for example a $TiO_2$ membrane) or a polymeric membrane (for example a Koch MPF 34 (flatsheet) or a Koch MPS-34 (spiral wound) membrane). The C9-C20 oligomers and the C20+ oligomers can conveniently be separated from each other with for example a polymer grafted $ZrO_2$ membrane. The use of membranes for these separations can advantageously improve the energy efficiency of the process.

In another embodiment excess water produced during the liquefaction process is removed by distillation, pervaporation and/or reversed osmosis.

In a preferred embodiment, at least part of any water, co-solvent, acid catalyst and/or hydrogenation catalyst is advantageously recovered to be recycled for re-use in the liquefaction process.

In a further preferred embodiment, this recycle stream also contains at least part of any monomeric compounds and/or oligomeric products.

Any excess of water, co-solvent, acid catalyst, hydrogenation catalysts and/or monomeric compounds is preferably purged via a purge stream.

If desirable, the purge stream can be separated into a monomer-stream containing monomeric compounds and a water-stream containing water. Subsequently at least part of the monomer-stream can be used as a fuel precursor and the water stream can be send to a water treatment plant. In addition part of the monomer-stream and/or the water stream can be recycled to the liquefaction reactor.

In the process of the invention, preferably more than or equal to 50% by weight, more preferably more than or equal to 60% by weight and most preferably more than or equal to 70% by weight of the cellulosic material may advantageously be liquefied into liquefied product, preferably in less than 3 hours.

From the liquefied product a product containing one or more monomeric compounds and/or one or more oligomeric compounds can be obtained. For example when the liquefied product contains monomeric compounds, oligomeric compounds and excess water produced in the liquefaction, monomeric and/or oligomeric compounds and excess water may be separated via distillation or another suitable separation technique as described above. When the liquefied product consists essentially of monomeric and/or oligomeric compounds, no specific recovery steps are needed to obtain the product containing one or more monomeric compounds and/or one or more oligomeric compounds.

The product containing one or more monomeric compounds and/or one or more oligomeric compounds preferably comprises in the range from 20 wt % to 80 wt %, more preferably in the range of 25 wt % to 75 wt %, of one or more monomeric compounds having a molecular weight (Mw) of less than or equal to 250 Dalton (Da); and/or in the range from 20 wt % to 80 wt %, more preferably in the range of 25 wt % to 75 wt %, of one or more oligomeric compounds having a molecular weight (Mw) of more than 250 Dalton (Da). More preferably the liquefied product can comprise a product that consists essentially of in the range from 20 wt % to 80 wt %, more preferably in the range of 25 wt % to 75 wt %, of one or more monomeric compounds having a molecular weight (Mw) of less than or equal to 250 Dalton (Da); and in the range from 20 wt % to 80 wt %, more preferably in the range of 25 wt % to 75 wt %, of one or more oligomeric compounds having a molecular weight (Mw) of more than 250 Dalton (Da).

The weight ratio of the monomeric compound(s) to the oligomeric compound(s) preferably lies in the range from 4:1 to 1:4, more preferably in the range from 3:1 to 1:3. The oligomeric compounds preferably comprise less than or equal to 50 wt %, more preferably less than or equal to 40 wt % of tar, based on the total weight of oligomeric compounds. There is no lower limit for the weight percentage of tar but in practice the weight percentage of tar can be more than 1 wt % or 3 wt %, based on the total weight of the oligomeric compounds.

Further the oligomeric compounds preferably comprise more than or equal to 50 wt %, more preferably more than or equal to 40 wt % of the oligomeric compounds that are liquid at ambient temperature (20° C.) and pressure (1 bar absolute), based on the total weight of oligomeric compounds. There is no upper limit for the weight percentage of oligomeric compounds that are liquid at ambient temperature (20° C.) and pressure (1 bar absolute) but in practice the weight percentage can be less than 97 wt % or 99 wt %, based on the total weight of the oligomeric compounds.

Hence in a preferred embodiment the product may comprise in the range of 20 wt % to 80 wt % of one or more monomeric compounds; in the range of 20 wt % to 80 wt % of one or more oligomeric compounds that are liquid at ambient temperature (20° C.) and pressure (1 bar absolute); and in the range from 0 wt % to 25 wt % of tar.

As a result of the liquefaction process used, the oligomeric compounds, and optionally also the monomeric compounds, may have an advantageous high saturation level. The process of the invention thus advantageously allows one to minimize or abandon any subsequent hydrogenation process and/or to forward the produced oligomeric and/or monomeric compounds directly to a subsequent hydrodeoxygenation and/or cracking unit.

The saturation level can be determined by calculating the percentage of sp3 carbons atoms based on the total of sp3,sp2 and sp carbons atoms determined by means of $^{13}$C-NMR. The percentage of saturated carbon atoms in the fraction of oligomeric compounds (i.e. the percentage of sp3 carbons, based on the total amount of carbons, as determined by $^{13}$C-NMR spectroscopy at a chemical shift below 100 ppm) is preferably more than or equal to 35%, more preferably more than or equal to 50%, still more preferably more than or equal to 60% and most preferably more than or equal to 70%, based on the total amount of carbon atoms present. The percentage of carbon atoms in the fraction of oligomeric compounds that is saturated (i.e. the percentage of sp3 carbons, based on the total amount of carbons, as determined by $^{13}$C-NMR spectroscopy at a chemical shift below 100 ppm) may further be less than or equal to 99%, or less than or equal to 95%, or less than or equal to 90%, based on the total amount of carbon atoms present.

When the monomeric compounds can be separated from the co-solvent, also the saturation level for the monomeric compounds can be determined by means of $^{13}$C-NMR. The percentage of saturated carbon atoms in the fraction of monomeric compounds (i.e. the percentage of sp3 carbons, based on the total amount of carbons, as determined by $^{13}$C-NMR spectroscopy at a chemical shift below 100 ppm) is preferably more than or equal to 50%, more preferably more than or equal to 60%, still more preferably more than or equal to 70% and most preferably more than or equal to 75%, based on the total amount of carbon atoms present. The percentage of saturated carbon atoms in a fraction of monomeric compounds (i.e. the percentage of sp3 carbons, based on the total amount of carbons, as determined by $^{13}$C-NMR spectroscopy at a chemical shift below 100 ppm) may further be less than or equal to 99.9%, or less than or equal to 99%, or less than or equal to 95%, based on the total amount of carbon atoms present.

By monomeric compounds is herein understood compounds that have a molecular weight (Mw) of less than or equal to 250 Dalton (Da). Preferably the monomeric compounds have a molecular weight (Mw) of at least 50 Dalton (Da). The molecular weight can be determined by Size Exclusion Chromatography (SEC). The monomeric compounds, also sometimes referred to as monomers, further preferably comprise compounds that have the potential of chemically binding to other monomeric compounds of the same species to form an oligomeric compound.

Preferably the product contains a mixture of two or more monomeric compounds. The monomeric compounds can include cyclic, branched and/or linear compounds. The monomeric compounds preferably have from 1 to 20 carbon atoms, more preferably from 4 to 17 carbon atoms. For example, the monomeric compounds preferably include C4 monomeric compounds, C5-C6 monomeric compounds and/or lignin fragments. Preferably the monomeric compounds include tetrahydropyran (oxane) and/or substituted furane compounds, substituted tetrahydrofurane compounds, substituted tetrahydropyran compounds, substituted phenol compounds, substituted guaiacol (orthomethoxyphenol) substituted syringol (di-orthomethoxy phenol) and/or various alcohols, ketones, carboxylic acids or carboxylate esters. More preferably the monomeric compounds comprise substituted tetrahydrofurane, substituted tetrahydropyran, substituted guaiacol and/or substituted syringol in an amount of more than or equal to 20 wt %, still more preferably more than or equal to 50 wt % and most preferably more than or equal to 70 wt %, based on the total weight of monomeric compounds.

An example of a C4 monomeric compound is 1-hydroxy-2-butanon. Examples of C5-C6 monomeric compounds include C5-C6 unsaturated rings such as for example 2-furancarboxaldehyde and 2-furanmethanol; and/or C5-C6 saturated rings such as for example tetrahydro-2-furanmethanol, tetrahydro-2-methyl-furan, tetrahydro-2H-pyran (Oxane), tetrahydro-2H-pyran-2-ol, tetrahydro-2H-2-methyl-pyran, tetrahydro-2,5-dimethyl-furan and tetrahydro-2-hydroxy-5-methyl-furan; and/or C5-C6 linear ketones, esters acids and alcohols such as for example 4-oxo-pentanoic acid, 2-pentanone, 2-hexanone, 1-hexanol, 2,5-hexanedione and 1-pentanol. Examples of lignin fragments include 2,6-dimethoxy-4-ethyl-1-phenol and 2-methoxy-4-ethyl-1-phenol.

The monomeric compounds and/or oligomeric compounds can advantageously be converted into gasoline components, such as ethyl valerate, methyl furan, ethyl furfuryl ether, methyltetrahydrofuran, esterified and/or etherified oligomers or other hydrocarbons by means of hydrogenation, esterification, etherification and/or dehdyration reactions.

In one embodiment of the invention, at least part of the monomeric compounds in the product is recovered and directly used as or converted into a fuel component, preferably a gasoline component.

By oligomeric compounds is herein understood compounds that have a molecular weight (Mw) of more than 250 Dalton (Da).

The molecular weight can be determined by Size Exclusion Chromatography (SEC). An oligomeric compound, also sometimes referred to as oligomer, further preferably consist of 2 to 15, more preferably 2 to 10, still more preferably 2 to 6 and most preferably 2 to 4 monomer units.

Preferably the product contains a mixture of two or more oligomeric compounds. The oligomeric compounds can include cyclic, branched and/or linear compounds. The oligomeric compounds can include oligomeric compounds that are liquid at ambient temperature (20° C.) and pressure (1 bar absolute) and so-called tar. By tar is understood that part of the product that is solid at ambient temperature (20° C.) and pressure (1 bar absolute), but that melts when heated and/or dissolves in a different solvent. Preferably the oligomeric compounds that are liquid at ambient temperature (20° C.) and pressure (1 bar absolute) have a molecular weight (Mw) in the range of more than 250 Dalton (Da) up to and including 2000 Dalton (Da). The percentage of saturated carbon atoms in the oligomeric compound fraction that is liquid at ambient temperature (20° C.) and pressure (1 bar absolute) is preferably more than or equal to 50%, more preferably more than or equal to 60%, still more preferably more than or equal to 70%, based on the total amount of carbon atoms and less than or equal to 99.9%, or less than or equal to 99%, or less than or equal to 95%, based on the total amount of carbon atoms.

The tar preferably has a molecular weight (Mw) from more than 2000 Dalton (Da) up to and including 30000 Dalton (Da). In a further embodiment, preferably at least part of the liquefied product or at least part of an obtained product comprising one or more monomeric compounds and/or one or more oligomeric compounds is converted into a fuel component, preferably for a diesel or gasoline fuel. More preferably at least part of any oligomeric compounds is recovered and converted to a fuel component, preferably for a diesel fuel. At least part of the liquefied product, the product comprising one or more monomeric compounds and/or one or more oligomeric compounds, or the oligomeric compounds can be converted in any manner known to be suitable for that purpose. The conversion may for example be carried out by fractionation, hydrodeoxygenation, catalytic cracking, thermal cracking and/or hydrocracking.

Preferably the conversion comprises at least hydrodeoxygenating and/or cracking to produce a fuel component or fuel component precursor.

More preferably at least part of the liquefied product or obtained product containing monomeric and/or oligomeric compounds is at least partially hydrodeoxygenated, rendering it hydrocarbon soluble, prior to being blended with a refinery stream such as crude oil, (vacuum) gasoil or (heavy) cycle oil and being subjected to further hydrodeoxygenation or a thermal-, catalytic- or hydro-cracking processes. The hydrodeoxygenation can be performed in any manner known to be suitable for that purpose. For example the hydrodeoxygenation may be performed under hydrodeoxygenation conditions in the presence of a hydrodeoxygenation catalyst. The hydrodeoxygenation catalyst may contain a metal of any one of groups 8 to 11 of the Periodic Table of Elements. Following the initial hydrodeoxygenation step, the at least partially deoxygenated products can be recovered from the solvents, for example by liquid/liquid separation techniques, prior to possibly being subjected to upgrading to a fuel component or fuel component precursor by means of further hydrodeoxygenation or by thermal-, catalytic- or hydro-cracking processes.

The fuel component or fuel component precursor can be used in the preparation of a biofuel such as a biodiesel, biokerosine or biogasoline.

Figure 2:
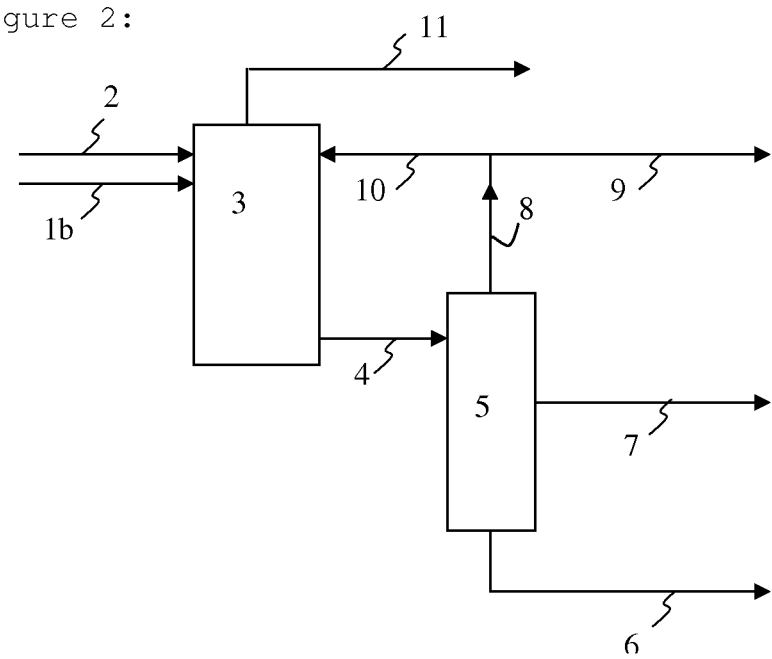
FIG. 2 shows a schematic diagram of a second process according to the invention.

FIGS. 1 and 2 show illustrate two different processes according to the invention.

In FIG. 1, a feed stream (1a) comprising solid biomass, acid catalyst, homogeneous hydrogenation catalyst and solvent mixture (water and co-solvent); and a stream (2) comprising hydrogen gas are supplied to a liquefaction reactor (3). In liquefaction reactor (3) simultaneous hydrolysis and hydrogenation is carried out to produce an effluent stream (4) comprising liquefied product, humins, acid catalyst, homogeneous hydrogenation catalyst and solvent mixture (and optionally dissolved hydrogen gas). The effluent stream (4) is forwarded to separation section (5). In separation section (5) the effluent stream (4) is separated into a stream (6) comprising insoluble humins, a stream (7) comprising liquefied product including oligomeric and, optionally, some monomeric compounds, and a stream (8) comprising solvent mixture (water and co-solvent), homogeneous hydrogenation catalyst and acid catalyst and the remaining monomeric compounds (and optionally dissolved hydrogen gas). Part of stream (8) is purged via a stream (9) and the other part is recycled via a stream (10) to liquefaction reactor (3). The purge stream (9) can optionally be treated to recover part of the co-solvent and/or acid for recycling to the liquefaction reactor (3).

A stream (11) comprising gaseous products including any unconverted hydrogen leaves the liquefaction reactor (3) via the top.

In the process as illustrated by FIG. 1 the stream (2) comprising hydrogen flows counter-currently to the stream (1a) comprising solid biomass, acid catalyst, homogeneous hydrogenation catalyst and solvent mixture (water and co-solvent).

In FIG. 2, a feed stream (1b) comprising solid biomass, acid catalyst, and solvent mixture (water and co-solvent); and a stream (2) comprising hydrogen gas are supplied to a liquefaction reactor (3). The stream (2) comprising hydrogen flows co-currently to the stream (1b) comprising solid biomass, acid catalyst, and solvent mixture (water and co-solvent). The liquefaction reactor (3) further contains heterogeneous hydrogenation catalyst in a fixed bed (12). The remaining numerals are the same as in FIG. 1, except that streams (8), (9) and (10) do not contain the hydrogenation catalyst.

In an alternative embodiment of the process of the invention (not shown) also part of the oligomeric compounds is recycled via streams (8) and (10) to the liquefaction reactor (3).

Throughout the description and claims of this specification, the words "comprise" and "contain" and variations of the words, for example "comprising" and "comprises", mean "including but not limited to", and do not exclude other moieties, additives, components, integers or steps.

The invention will now be further illustrated by means of the following non-limiting examples and comparative examples.

Comparative Examples A, B and C and Examples 1-15

The experiments were performed according to the following conditions:

About 3.5 g of Birch wood (particle size <4 mm, semi-dried at 105° C.) was loaded into a 60 mL autoclave together with about 35 g of solvent mixture which contained water, acetic acid co-solvent, acid catalyst and hydrogenation catalyst in a ratio as indicated in table 1. The weight ratio of birch wood to reaction solution (that is the weight ratio of birch wood to the total sum of acid catalyst, hydrogenation catalyst, water and co-solvent) is also indicated in table 1. The weight ratio of each of the acid catalyst, hydrogenation catalyst, water and co-solvent in the reaction solution (i.e. in the total sum of acid catalyst, hydrogenation catalyst water and co-solvent) is also indicated in table 1. For the hydrogenation catalyst only the weight % hydrogenation metal is mentioned. The total of birch wood and reaction solution was stirred (1400 rpm). The autoclave was sealed, pressurized to 50 bar of $H_2$ (except for the comparative example) and heated to a temperature as indicated in table 1. Subsequently the H2 pressure was adjusted to the hydrogen pressure indicated in table 1. After a reaction time of 90 min the autoclave was cooled to room temperature (20° C.) and opened and appropriate samples were taken.

The total product, including liquid, tar, insoluble humins and catalyst, was removed from the autoclave. The total product was subsequently filtered over a P3 filter to produce a filtrate and a filter cake. The filter cake was washed with acetone and dried under vacuum (200 mbar) at 50° C. overnight. The residual filter cake was weighted to determine the weight percentage of insoluble humins, based on the weight of birch wood feedstock. Liquefaction was calculated as 100 wt %-wt % insoluble humins, based on the weight of birch wood feedstock.

The monomeric compounds were analysed by Gas Chromatography (GC) and a combination of Gas Chromatography and Mass Spectroscopy (GC/MS).

The oligomeric compounds were analyzed by means of Size Exclusion Chromatography (SEC), using PL-gel polymer as immobile phase, THF as mobile phase and using Ultraviolet (UV, 254 nm wave length) and refractive index (RI) detectors. Table 2 provides a summary of the product characteristics. The extent of liquefaction and the weight percentages of insoluble humins, monomeric compounds and oligomeric compounds in table 1 were calculated based on the weight of birch wood feedstock.

The molecular weight distribution of the oligomeric compounds was determined between 150 and 30000 Dalton, using a series of polystyrene oligomer samples of known molecular weight as calibration.

The weight amount of oligomeric compounds was determined by RI using a series of samples loaded with known weight amounts of lignin as calibration.

Table 1 further includes a saturation index as a qualitative indication of the extent of saturation of the oligomeric compounds. The saturation index of the oligomeric compounds was determined, using a sample of a 1 wt % solution of lignin (Organosols lignin no 37, 101-7 LN 12620MG obtained from Aldrich) in THF as calibration. The sample of lignin was analyzed with SEC as described above and the ratio of the amount of lignin detected by RI to the amount of lignin detected by UV was set to be 1.0. Subsequently samples of solutions of the oligomeric compounds in THF were analyzed with SEC and the ratio of the weight amount of oligomeric compounds detected by RI to the weight amount of oligomeric compounds detected by UV was calculated for each sample. The saturation index for each sample of oligomeric compounds can subsequently be determined against the lignin calibration as indicated in formula (I)

$$\text{Saturation index} = \frac{\{[\text{Oligomer}]_{RI}/[\text{Oligomer}]_{UV}\}}{\{[\text{lignin}]_{RI}/[\text{lignin}]_{UV}\}} \quad (I)$$

wherein $[\text{Oligomer}]_{RI}$=the weight concentration of oligomeric compounds as determined by the refractive index detectors;

[Oligomer]$_{UV}$=the weight concentration of oligomeric compounds as determined by using Ultraviolet (254 nm wave length);
[lignin]$_{RI}$=the weight concentration of oligomeric compounds as determined by the refractive index detectors; and
[lignin]$_{UV}$=the weight concentration of oligomeric compounds as determined by using Ultraviolet (254 nm wave length).
A higher saturation index indicates a higher degree of saturation. A saturation index above 1 indicates a higher degree of saturation than in lignin.

As can be seen by comparing respectively comparative examples A, B and C with respectively examples 1-3, examples 4-7 and examples 8-10 and 12-15, the process of the invention results in improved liquefaction and a higher level of saturation for the oligomeric compounds.

Abbreviations Used in Table 1 Include

BW birch wood

AA acetic acid

W Water

TABLE 1

Process conditions for comparative examples A, B and C and examples 1-15

| Exp | BW (BW:W + AA wt ratio) | Water (wt %) | Co-solv. AA(wt %) | Acid cat. | Acid cat. (wt %) | Hydr. cat | Hydr. Cat. (wt %) | P(H2) bar | Temp (° C.) | Time (min) |
|---|---|---|---|---|---|---|---|---|---|---|
| Comp A | 1:10 | 68 | 29 | H$_2$SO$_4$ | 3 | — | 0.00 | 0$^a$ | 200 | 90 |
| 1 | 1:10 | 68 | 29 | H$_2$SO$_4$ | 3 | Pd/C | 0.37 | 80 | 200 | 90 |
| 2 | 1:10 | 68 | 29 | H$_2$SO$_4$ | 3 | Pd(Ac)2 | 0.31 | 80 | 200 | 90 |
| 3 | 1:10 | 68 | 29 | H$_2$SO$_4$ | 3 | RuAcCl | 0.29 | 80 | 200 | 90 |
| Comp B | 1:10 | 70 | 30 | — | 0.0 | Pd(Ac)2 | 0.33 | 80 | 200 | 90 |
| 4 | 1:10 | 69 | 30 | H3PO4 | 1.4 | Pd(Ac)2 | 0.33 | 80 | 200 | 90 |
| 5 | 1:10 | 67 | 29 | H3PO4 | 3.3 | Pd/C | 0.33 | 80 | 200 | 90 |
| 6 | 1:10 | 70 | 30 | H2SO4 | 0.3 | Pd(Ac)2 | 0.30 | 80 | 200 | 90 |
| 7 | 1:10 | 68 | 29 | H2SO4 | 3.3 | Pd(Ac)2 | 0.31 | 80 | 200 | 90 |
| Comp C | 1:10 | 100 | 0 | H2SO4 | 3.2 | Pd(Ac)2 | 0.24 | 80 | 200 | 90 |
| 8 | 1:10 | 68 | 29 | H2SO4 | 3.3 | Pd(Ac)2 | 0.31 | 80 | 200 | 90 |
| 9 | 1:10 | 70 | 30 | H2SO4 | 0.3 | Pd(Ac)2 | 0.30 | 80 | 200 | 90 |
| 10 | 1:10 | 40 | 60 | H2SO4 | 0.4 | Pd(Ac)2 | 0.32 | 80 | 200 | 90 |
| 11 | 1:10 | 70 | 29 | H2SO4 | 0.3 | Pd(Ac)2 | 0.33 | 80 | 180 | 90 |
| 12 | 1:10 | 70 | 30 | H2SO4 | 0.3 | Pd(Ac)2 | 0.30 | 80 | 200 | 90 |
| 13 | 1:10 | 68 | 29 | H2SO4 | 3.3 | Pd(Ac)2 | 0.31 | 80 | 200 | 90 |
| 14 | 1:5.5 | 68 | 29 | H2SO4 | 3.3 | Pd(Ac)2 | 0.32 | 80 | 200 | 90 |
| 15 | 1:4 | 68 | 29 | H2SO4 | 3.2 | Pd(Ac)2 | 0.31 | 80 | 200 | 90 |

TABLE 2

Product characteristics for comparative examples A, B and C and examples 1-15

| Exp | Liquefaction (wt % on BW) | Insol. Humins (wt % on BW) | Oligomeric comp.* (wt % on BW) | Monomeric comp. (wt % on BW) | Saturation index for oligomeric comp. |
|---|---|---|---|---|---|
| Comp A | 63 | 37 | 17 | 19 | 1, 4 |
| 1 | 95 | 5 | 13 | 25 | 2, 2 |
| 2 | 88 | 12 | 16 | 14 | 1, 6 |
| 3 | 90 | 10 | 15 | 18 | 2, 1 |
| Comp B | 68 | 32 | 20 | 23 | 2, 6 |
| 4 | 81 | 19 | 22 | 24 | 1, 9 |
| 5 | 90 | 10 | 12 | 32 | 2, 4 |
| 6 | 93 | 7 | 21 | 24 | 2 |
| 7 | 88 | 12 | 16 | 14 | 1, 6 |
| Comp C | 78 | 22 | 11 | 19 | 1, 8 |
| 8 | 88 | 12 | 16 | 14 | 1, 6 |
| 9 | 93 | 7 | 21 | 24 | 2 |
| 10 | 92 | 8 | 30 | 25 | 1, 2 |
| 11 | 74 | 26 | 23 | 20 | 2, 6 |
| 12 | 93 | 7 | 21 | 24 | 2 |
| 13 | 88 | 12 | 16 | 14 | 1, 6 |
| 14 | 81 | 19 | 12 | 15 | 1, 4 |
| 15 | 86 | 14 | 12 | 14 | 1, 7 |

*Only oligomeric compounds being liquid at 20° C. and 1 bar absolute were included.

Example 16

About 3.3 g of Birch wood (particle size <4 mm, semi-dried at 105° C.) was loaded into a 60 mL autoclave together with about 0.1 gram of Palladium as Pd/C catalyst, 21 grams of water, 9 grams of acetic acid, and 0.1 gram of sulphuric acid (H2SO4).

The autoclave was sealed, pressurized to 50 bar of $H_2$ (except for the comparative example) and heated to a temperature of 200° C. Subsequently the H2 pressure was adjusted to 80 bar. After a reaction time of 90 min the autoclave was cooled to room temperature (20° C.) and opened and appropriate samples were taken.

The total product, including liquid, tar, insoluble humins and catalyst, was removed from the autoclave. The total product was subsequently filtered over a P3 filter to produce a filtrate and a filter cake. The filter cake was washed with acetone and dried under vacuum (200 mbar) at 50° C. overnight. The dissolved oil (a mixture of monomeric and oligomeric compounds) was analyzed by means of GC, GC/MS, SEC and $^{13}C$-NMR. A fraction of the dissolved oil was dried under vacuum and the residual oil (mainly oligomeric compounds liquid at 20° C. and 1 bar absolute) was analyzed again by all the methods mentioned above.

In table 3 a product distribution is provided.

Furthermore table 4 lists the extent of unsaturation of the monomeric and oligomeric fraction as determined by $^{13}C$-NMR.

TABLE 3 product distribution for example 16

| Product | wt % on BW |
|---|---|
| monomeric | 33 |
| oligomeric | 14 |
| Tar | n.d. |
| Humins | 10 |
| Total | 67** |

**part from the Birch Wood may have been converted to water and gaseous products not listed in table 3, as a result the total is less than 100 wt %

TABLE 4

$^{13}C$-NMR analysis of liquefied product for example 16

| Function | Chemical shift (ppm) | Total of Monomeric and oligomeric compounds* (% carbon) | Oligomeric compounds only* (% carbon) |
|---|---|---|---|
| >C=O | >200 | 7 | 2 |
| >C(O)O— | 160-180 | 4 | 7 |
| >C=C< | 100-160 | 13 | 18 |
| Total sp2 | >100 | 24 | 27 |
| >C—O— | 60-100 | 18 | 19 |
| C—C | <60 | 58 | 54 |
| Total sp3 | <100 | 76 | 73 |

Only oligomeric compounds being liquid at 20° C. and 1 bar absolute were included.

Examples 17 and 18

The experiment as described in example 16 was scaled up by a factor of ~5 using the process characteristics as listed in table 5.

The listed amounts of Birch wood (BW, particle size <4 mm, semi-dried at 105° C.), Palladium (Pd) as Pd-acetate catalyst (only grams metal listed), Water (W), Acetic Acid co-solvent (AA), and sulfuric acid (H2SO4) were loaded into a 250 mL autoclave.

The autoclave was sealed, pressurized to 50 bar of $H_2$ (except for the comparative example) and heated to a temperature of 200° C. Subsequently the H2 pressure was adjusted to 80 bar. After a reaction time of 90 min the autoclave was cooled to room temperature (20° C.) and opened and appropriate samples were taken.

The total product, including liquid, tar, insoluble humins and catalyst, was removed from the autoclave. The total product was subsequently filtered over a P3 filter to produce a filtrate and a filter cake. The filter cake was washed with acetone and dried under vacuum (200 mbar) at 50° C. overnight. The acetone solution was dried and the residue (tar) was weighted. The dissolved oil (a mixture of monomeric and oligomeric compounds) was analyzed by means of GC, GC/MS, SEC and $^{13}C$-NMR. A fraction of the dissolved oil was dried under vacuum and the residual oil (oligomeric compounds liquid at 20° C. and 1 bar absolute) was analyzed again by all the methods mentioned above. The tar (oligomeric compounds that are solid at 20° C. and 1 bar absolute but become liquid upon melting or dissolution) are analyzed by SEC and $^{13}C$-NMR.

The obtained product distribution is also reflected in table 5. Furthermore table 6 lists the extent of saturation of the tar fraction as determined by $^{13}C$-NMR in example 18.

TABLE 5

Process characteristics and Product distribution.

| | Ex. | |
|---|---|---|
| | 17 | 18 |
| Process characteristics (intake in grams) | | |
| BW (dry) | 16 | 23 |
| Pd as Pd(Ac)2 | 1.0 | 1.4 |
| W | 105 | 71 |
| AA | 45 | 30 |
| H2SO4 | 0.5 | 0.7 |
| Product distribution (wt % on BW) | | |
| monomeric | 36 | 30 |
| oligomeric | 25 | 21 |
| Tar | 10 | 13 |
| Humins | 12 | 9 |
| total | 83 | 73 |

TABLE 6

$^{13}C$-NMR analysis of tar in example 18

| Function | Chemical shift | Tar (% carbon) |
|---|---|---|
| >C=O | >200 | 4 |
| >C(O)O— | 160-180 | 5 |
| >C=C< | 100-160 | 28 |
| Total sp2 | >100 | 37 |
| >C—O— | 60-100 | 11 |
| C—C | <60 | 52 |
| Total sp3 | <100 | 63 |

Example 19

About 3.5 g of Birch wood (particle size <4 mm, semi-dried at 105° C.) was loaded into a 60 mL autoclave (Hastelloy® C22® alloy) together with water (21 g), acetic acid (9 g), sulphuric acid (0.1 g) and Pd/C (2 g, containing 0.1 g Pd).

The autoclave was closed and pressurised with $H_2$ to 50 bar. Subsequently the autoclave content was heated in 10-15 min to the reaction temperature (200° C.), after which the hydrogen ($H_2$) pressure was adjusted to 80 bar. The hydroliquefaction was continued for 90 minutes. As a result of $H_2$ consumption a small pressure drop of 10-20 bar was observed. The hydroliquefaction was stopped by rapidly reducing the temperature to <10° C., subsequently the hydrogen was vented.

After opening the autoclave, the total product, including liquid, tar, insoluble humins and catalyst, was removed from the autoclave. The total product was subsequently filtered over a P3 glassfilter to produce a filtrate and a filter cake.

The filter cake, containing insoluble humins and catalyst, was washed with 50 ml acetone and dried overnight at 50° C. under vacuum (100-150 mbar) The dried filter cake was weighted to determine the weight percentage of insoluble humins, based on the weight of birch wood feedstock. After corrections for the catalyst, the humins yield was 0.2-0.3 gram; <10 w % based on the weight of birch wood feedstock).

The filtrate contained monomeric compounds, oligomeric compounds and water. The monomeric compounds and oligomeric compounds were extracted from the water by means of liquid-liquid extraction using methyltetrahydrofuran.

Figure 3:
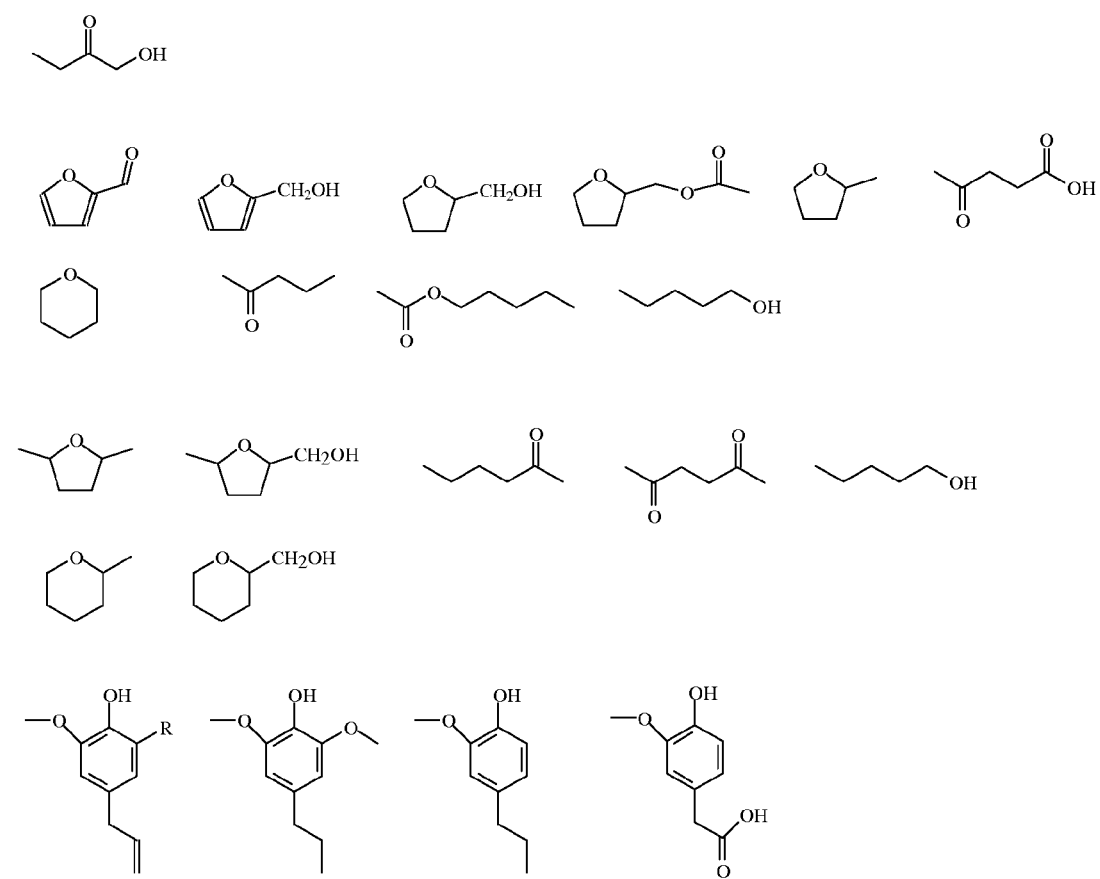
FIG. 3 illustrates molecular structures of some of the monomeric compounds in example 19.

The monomeric compounds were analyzed by GC/MS. The molecular structures of some of the monomeric compounds found are given in FIG. 3. Where no element is indicated the element is hydrogen. The monomeric compounds found included tetrahydropyran, methyl-tetrahydropyran and hydroxymethyltetrahydropyran. The tetrahydropyran, methyl-tetrahydropyran and hydroxymethyltetrahydropyran can advantageously be blended with other components into a biofuel. Without wishing to be bound by any kind of theory it is believed that tetrahydropyrans have a higher volumetric energy density (i.e. energy per liter) than methyltetrahydrofurans (i.e. isomers with the same atomic composition).

We claim:

1. A process for liquefying a cellulosic material to produce a liquefied product, said process comprising: contacting the cellulosic material simultaneously with
   (a) an acid catalyst in an amount in a range of 4 wt % to 40 wt % based on the weight of cellulosic material;
   (b) a solvent mixture containing water and a co-solvent, wherein the co-solvent comprises one or more polar solvents and in an amount of equal to or more than 10% by weight and less than or equal to 95% by weight, based on the total weight of water and co-solvent;
   (c) a hydrogenation catalyst; and
   (d) a source of hydrogen;
   to produce a liquefied product
   wherein the liquefied product comprises monomeric compounds selected from the group consisting of tetrahydropyran, substituted furane compounds, substituted tetrahydrofurane compounds, substituted tetrahydropyran compounds, substituted phenol compounds, substituted guaiacol compounds, substituted syringol compounds, and any combination thereof.

2. The process of claim 1 wherein the co-solvent has a polarity of log P less than +1.

3. The process of claim 1 wherein the co-solvent comprises at least part of the liquefied product, wherein the at least part of the liquefied product comprises one or more polar solvents.

4. The process of claim 1 wherein the acid catalyst is a mineral or organic acid having a pKa in water below 3.75.

5. The process of claim 1 wherein the hydrogenation catalyst is a homogeneous catalyst or a heterogeneous catalyst.

6. The process of claim 1 wherein the source of hydrogen comprises hydrogen gas and the hydrogen gas is contacted with the cellulosic material in a countercurrent manner.

7. The process of claim 6 wherein the co-solvent comprises at least part of the liquefied product, wherein the at least part of the liquefied product comprises one or more polar solvents.

8. The process of claim 1 wherein the co-solvent comprises acetic acid.

9. The process of claim 1 wherein the liquefied product comprises from 20 wt % to 80 wt % monomeric compounds.

* * * * *